US012693426B2

(12) United States Patent
Hanasaka et al.

(10) Patent No.: US 12,693,426 B2
(45) Date of Patent: Jul. 28, 2026

(54) OPTICAL APPARATUS, ON-BOARD SYSTEM, AND MOVABLE APPARATUS

(71) Applicant: CANON KABUSHIKI KAISHA, Tokyo (JP)

(72) Inventors: Takashi Hanasaka, Tokyo (JP); Koichi Fukuda, Tokyo (JP); Shunichi Wakashima, Tokyo (JP); Kohei Okamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/962,635

(22) Filed: Nov. 27, 2024

(65) Prior Publication Data

US 2025/0093517 A1 Mar. 20, 2025

Related U.S. Application Data

(63) Continuation of application No. PCT/JP2023/019296, filed on May 24, 2023.

(30) Foreign Application Priority Data

Jul. 15, 2022 (JP) ................................. 2022-113805

(51) Int. Cl.
| | |
|---|---|
| *G01S 17/931* | (2020.01) |
| *B60T 7/22* | (2006.01) |

(Continued)

(52) U.S. Cl.
CPC .............. *G01S 17/931* (2020.01); *B60T 7/22* (2013.01); *G01S 7/4814* (2013.01); *G01S 17/08* (2013.01); *G08G 1/16* (2013.01); *B60T 2210/32* (2013.01)

(58) Field of Classification Search
CPC ...... G01S 17/931; G01S 7/4814; G01S 17/08; G01S 7/481; G01S 7/4815; G01S 7/4816;
(Continued)

(56) References Cited

U.S. PATENT DOCUMENTS

| | | | |
|---|---|---|---|
| 11,175,386 B2 * | 11/2021 | Dussan ................. | G01S 7/4813 |
| 2015/0347799 A1 * | 12/2015 | Gao ................... | G06K 7/10831 235/454 |

(Continued)

FOREIGN PATENT DOCUMENTS

| | | |
|---|---|---|
| CN | 112968350 A | 6/2021 |
| JP | 2010256674 A | 11/2010 |

(Continued)

OTHER PUBLICATIONS

Foreign Patent Documents #1-3 and 6-10 were cited in the International Search Report dated Jun. 27, 2023, of International Application No. PCT/JP2023/019296, a copy of which is enclosed.

(Continued)

*Primary Examiner* — Donald J Wallace
*Assistant Examiner* — Jalal C Coduroglu
(74) *Attorney, Agent, or Firm* — Cowan, Liebowitz & Latman, P.C.

(57) ABSTRACT

An optical apparatus includes a light emitter including at least one light emitting element, a light receiver including a plurality of light receiving elements, an optical element including a plurality of microlenses, an optical system including a first telecentric lens, and a processor configured to acquire distance information to an object based on a time required from when the light emitter emits light to when the light receiver receives the light reflected by the object. The number of microlenses is larger than the number of light emitting elements. The plurality of microlenses and the first telecentric lens form an afocal system.

18 Claims, 10 Drawing Sheets

(51) Int. Cl.

| | |
|---|---|
| *G01S 7/481* | (2006.01) |
| *G01S 17/08* | (2006.01) |
| *G08G 1/16* | (2006.01) |

(58) Field of Classification Search
CPC .......... G01S 17/42; G01S 17/93; G01S 17/10; G01S 7/4865; B60T 7/22; B60T 2210/32; G08G 1/16; G01C 3/06; G02B 5/02; G02B 27/0916; B60W 2420/408
See application file for complete search history.

(56) References Cited

U.S. PATENT DOCUMENTS

| | | | | |
|---|---|---|---|---|
| 2017/0153319 | A1* | 6/2017 | Villeneuve | G01S 7/484 |
| 2017/0208308 | A1* | 7/2017 | Iguchi | G03B 21/204 |
| 2018/0329065 | A1* | 11/2018 | Pacala | G01S 7/4865 |
| 2019/0317217 | A1* | 10/2019 | Day | G01S 7/026 |
| 2019/0331771 | A1* | 10/2019 | Iguchi | G01S 7/4816 |
| 2021/0173128 | A1* | 6/2021 | Nagahama | G02B 13/22 |
| 2022/0050203 | A1* | 2/2022 | David Keilaf | G05D 1/024 |
| 2022/0171204 | A1* | 6/2022 | Wu | G06T 7/557 |
| 2022/0229156 | A1* | 7/2022 | Nakano | G01S 7/4817 |
| 2022/0236384 | A1* | 7/2022 | Sutton | G02B 6/1228 |
| 2022/0308354 | A1* | 9/2022 | Boege | G02B 19/0009 |
| 2024/0255621 | A1* | 8/2024 | Ogawa | G01S 7/484 |

FOREIGN PATENT DOCUMENTS

| | | | |
|---|---|---|---|
| JP | 2018113552 | A | 7/2018 |
| JP | 2019020439 | A | 2/2019 |
| JP | 2019060652 | A | 4/2019 |
| JP | 2019139997 | A | 8/2019 |
| JP | 2020521954 | A | 7/2020 |
| JP | 2021534378 | A | 12/2021 |
| WO | 2019043102 | A1 | 3/2019 |
| WO | 2019113368 | A1 | 6/2019 |
| WO | 2021075340 | A1 | 4/2021 |
| WO | 2021145190 | A1 | 7/2021 |

OTHER PUBLICATIONS

PCT/IB/338 (PCT Notification of Transmittal of Translation of the International Preliminary Report on Patentability); PCT/IB/373 (PCT International Preliminary Report on Patentability); PCT/ISA/237 (PCT Written Opinion of the International Searching Authority).

* cited by examiner

401

402

DISTANCE BETWEEN
PROJECTED LIGHT BEAMS

PROJECTED
IMAGE SIZE

401

402

DISTANCE BETWEEN
PROJECTED LIGHT BEAMS

PROJECTED
IMAGE SIZE d

PROJECTED IMAGE SIZE d

DISTANCE BETWEEN
PROJECTED LIGHT BEAMS

OPTICAL APPARATUS, ON-BOARD SYSTEM, AND MOVABLE APPARATUS

CROSS-REFERENCE TO RELATED APPLICATIONS

This application is a Continuation of International Patent Application No. PCT/JP2023/019296, filed on May 24, 2023, which claims the benefit of Japanese Patent Application No. 2022-113805, filed on Jul. 15, 2022, which is hereby incorporated by reference herein in their entirety.

BACKGROUND

Technical Field

The disclosure relates to an optical apparatus, an on-board system (or in-vehicle system), and a movable apparatus.

Description of Related Art

A time-of-flight (TOF) distance measurement method has been known that measures a distance to an object by measuring a time difference from when light is irradiated onto the object to when reflected light from the object is detected. Japanese Patent Application Laid-Open No. 2019-60652 discloses a configuration that includes light emitting elements and light receiving elements that are two-dimensionally arranged, wherein light is irradiated onto an object through an imaging lens, reflected light from the object is received, and three-dimensional distance information is acquired without a driving unit. This configuration requires an angle of view of the emitted light and an angle of view of the received light to be approximately equal. Thus, in order to reduce the size of the distance measuring apparatus, the light emitting element array and the light receiving element array may have approximately the same sizes and share the imaging lens.

PCT International Publication No. 2019/043102 discloses a configuration that increases the resolution of projected light by multiplying the number of light beams constituting a light emitter that includes a two-dimensional light emitting element array a plurality of times using a diffractive optical element.

The configuration disclosed in PCT International Publication No. 2019/043102 is to increase the size of the light receiving element array in accordance with an angle of view increased by diffraction. Thus, this configuration has difficulty in achieving a compact and high-resolution distance measuring apparatus due to an angle of view expanded by the diffractive optical element.

SUMMARY

An optical apparatus according to one aspect of the disclosure includes a light emitter including at least one light emitting element, a light receiver including a plurality of light receiving elements, an optical element including a plurality of microlenses, an optical system including a first telecentric lens, and a processor configured to acquire distance information to an object based on a time required from when the light emitter emits light to when the light receiver receives the light reflected by the object. The number of microlenses is larger than the number of light emitting elements. The plurality of microlenses and the first telecentric lens form an afocal system. An on-board system and a movable apparatus each including the above optical apparatus also constitute another aspect of the disclosure.

Further features of various embodiments of the disclosure will become apparent from the following description of embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Overall Configuration of Distance Measuring Apparatus

Figure 1:
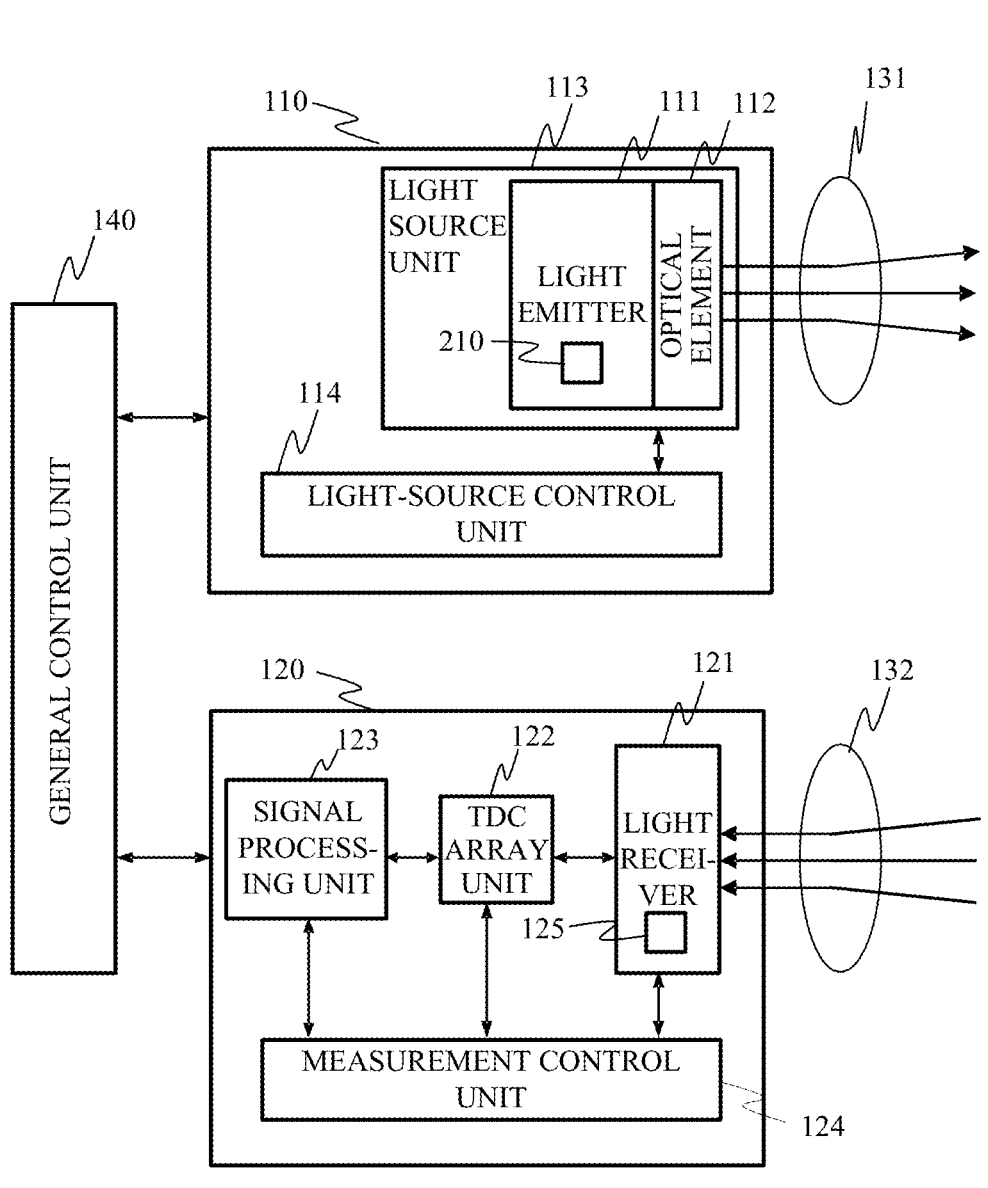
FIG. 1 is a block diagram of a distance measuring apparatus according to a first embodiment.

Referring now to FIG. 1, a description will be given of a schematic configuration of an optical apparatus (distance measuring apparatus) 1 according to a first embodiment. FIG. 1 is a block diagram of the optical apparatus 1. The optical apparatus 1 is an optical apparatus (light detection and ranging: LiDAR) that calculates a distance to an object based on the time from when light is emitted to when it is received by the TOF method. The optical apparatus 1 includes a light projection unit 110, a measurement unit 120, an image-side telecentric lens (first telecentric lens) 131, an image-side telecentric lens (second telecentric lens) 132, and a general control unit 140. The light projection unit 110 includes a light source unit 113 having a light emitter 111 and an optical element 112, and a light-source control unit 114.

Figure 2:
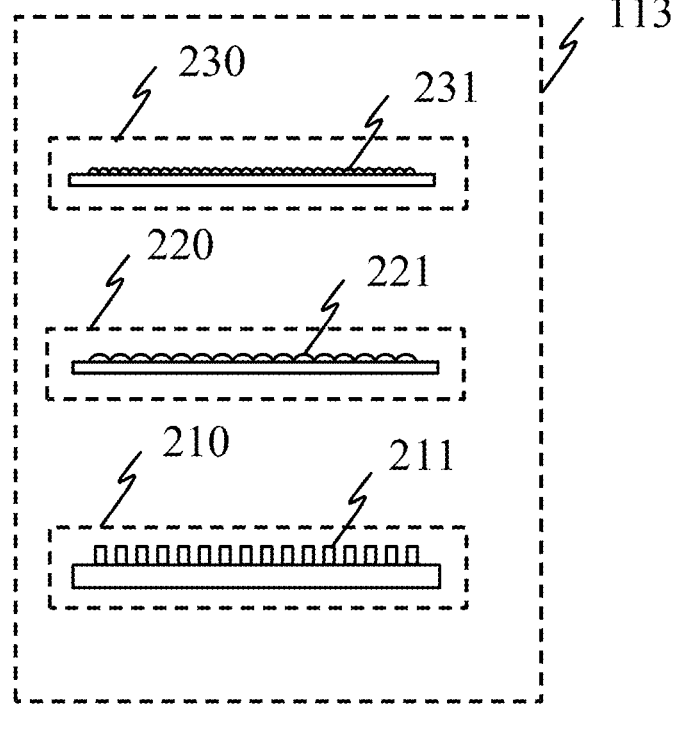
FIG. 2 is a schematic diagram of a light source unit according to each embodiment.

The light emitter 111 includes a light emitting element array 210 having a plurality of light emitting elements 211 that are arranged two-dimensionally (see FIG. 2). However, this embodiment is not limited to this example, and the light emitter 111 may have only a single light emitting element 211. In other words, the light emitter 111 may have at least one light emitting element 211. The optical element 112 includes a microlens array 230 having a plurality of micro-lenses 231 that are arranged two-dimensionally (see FIG. 2), and divides the light emitted from the light emitter 111 into a plurality of divided light beams.

The measurement unit 120 includes a light receiver 121, a Time-to-Digital Converter (TDC) array unit 122, a signal processing unit 123, and a measurement control unit 124. The light receiver 121 includes a light receiving element array 125 having a plurality of light receiving elements.

Each of the plurality of light emitting elements 211 in the light source unit 113 emits pulsed light, and the pulsed light is projected toward space through the image-side telecentric lens 131. Pulsed light beams emitted from different light emitting elements 211 are projected at different angles of view in space. The projected light is irradiated onto an object, and part of the light reflected by the object is received by the light receiver 121 via the image-side telecentric lens 132. The time from when the light emitting element 211 emits the light to when the light receiver 121 receives the light is the time of flight TOF. The TDC array unit 122 is a measurement unit that measures the time of flight TOF. However, it is difficult to remove noise components due to noise light such as ambient light and dark counts in a single measurement, and distance measurement errors increase due to the influence of noise in the measurement circuit, etc. Thus, the TDC array unit 122 repeatedly measures the time of flight TOF from when light is emitted to when it is received, and the signal processing unit 123 creates a histogram of the measurement results, removes noise components, and averages the measurement results. The TDC array unit 122 and the signal processing unit 123 constitute an acquiring unit that acquires distance information to an object based on the time required from when the light emitter 111 emits light to when the light receiver 121 receives the light reflected by the object.

By substituting the time of flight TOF thus obtained into the following equation (1), a distance L to the object can be obtained with high accuracy:

$$L = TOF \times c / 2 \tag{1}$$

where c is the light speed.

Light Source Unit

Referring now to FIG. 2, a description will be given of an example of the light source unit 113 constituting the light projection unit 110. FIG. 2 is a schematic diagram of the light source unit 113. The light emitting element array 210 is a VCSEL array including a plurality of vertical cavity surface emitting lasers (VCSELs) as a plurality of light emitting elements 211 that are arranged two-dimensionally on a substrate. In this embodiment, the light emitting elements 211 are not limited to VCSELs, but may be a light emitting element that can be integrated in a one-dimensional array or a two-dimensional array, such as an edge-emitting laser or an LED (light emitting diode).

In a case where the edge-emitting laser is used as the light emitting elements 211 instead of the VCSEL array, the light emitting element array 210 is, for example, a laser bar arranged one-dimensionally on a substrate or a laser bar stack arranged two-dimensionally by stacking them. The light emitting element array 210 is LEDs arranged two-dimensionally on a substrate in a case where LEDs are used as the light emitting elements 211.

In the optical apparatus 1 according to this embodiment, the wavelength of the light emitted by the light emitting elements 211 may be in the near-infrared band in order to suppress the influence of ambient light. However, this embodiment is not limited to this example. The VCSEL is manufactured using a semiconductor process using materials used in the conventional edge-emitting lasers and surface-emitting lasers. In a case where the VCSEL is configured to emit light with a wavelength in the near-infrared band, a GaAs-based semiconductor material can be used as the main material. In this case, a dielectric multilayer film forming a DBR (distribution reflection type) reflector constituting the VCSEL can be constructed by alternately and periodically stacking two thin films (e.g., GaAs/AlGaAs) made of materials with different refractive indices. The wavelength of the emitted light can be changed by adjusting the combination of elements or composition of the compound semiconductor.

The VCSELs constituting the VCSEL array include electrodes for injecting current and holes into the active layer, and can emit arbitrary pulsed light or modulated light by controlling the injection timing. Thus, the light-source control unit 114 can, for example, independently drive each of the plurality of VCSELs as the plurality of light emitting elements 211, or drive the VCSELs for each specific area, such as a row or column of the VCSEL array.

Each light emitted from the VCSELs as the light emitting elements 211 is usually divergent light due to the diffraction phenomena at the openings of the VCSEL. Thus, the light source unit 113 includes a collimator lens array 220 in which a plurality of collimator lenses 221 are arranged two-dimensionally in order to control the divergence angle of the divergent light or to change the divergent light into parallel light. In this embodiment, the plurality of collimator lenses 221 constituting the collimator lens array 220 are arranged in one-to-one correspondence with the plurality of light emitting elements 211. The light emitted from the VCSEL array collimated by the collimator lens array 220 is converted, for example, into parallel light perpendicular to the VCSEL array substrate. The collimator lens 221 may be omitted in a case where a radiation angle from the VCSEL is small due to the opening diameter or the like.

The light source unit 113 includes a microlens array 230 with a plurality of microlenses 231 that are arranged two-dimensionally to split the parallel light collimated by the plurality of collimator lenses 221 into a plurality of emitted light beams.

Method of Splitting (Dividing) Emitted Light

Figure 3:
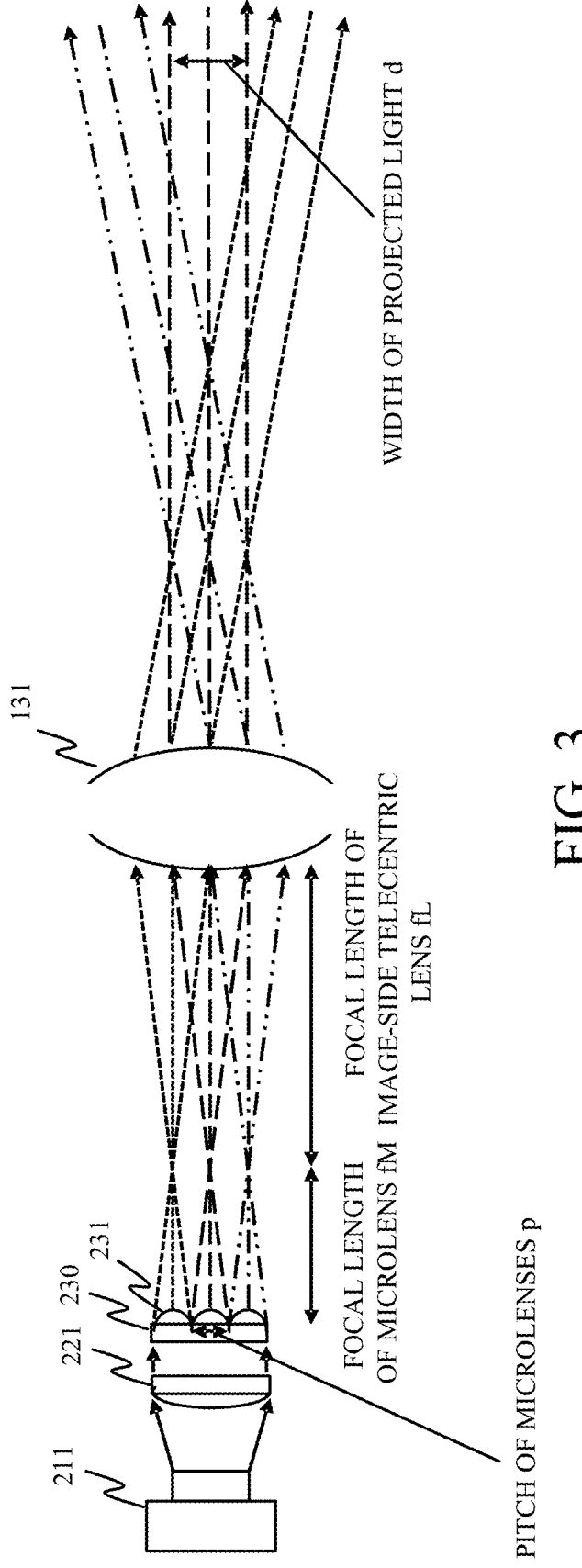
FIG. 3 explains a method of dividing emitted light according to each embodiment.

Referring now to FIG. 3, a description will be given of a method of splitting the light emitted from the light emitting element 211 into a plurality of emitted light beams. FIG. 3 explains a method of splitting emitted light, illustrating as an example how a single emitted light beam is split into a plurality of (3×3) emitted light beams. FIG. 3 illustrates a two-dimensional section.

The emitted light from the light emitting element 211 diverges due to diffraction, so it is collimated by the collimator lens 221 to become parallel light. The parallel light collimated by the collimator lens 221 is split into a plurality of emitted light beams by passing through the microlens array 230. The width (thickness three-dimensionally) of the parallel light collimated by the collimator lens 221 is to be larger than the diameter of the microlens 231. The plurality of emitted light beams split by the microlens array 230 are projected onto the object via the image-side telecentric lens 131.

The microlens 231 and the image-side telecentric lens 131 form an afocal system (non-focus optical system). Therefore, the lights are projected from the image-side telecentric lens 131 at angles according to image heights (a positional relationship between the microlens 231 and the image-side telecentric lens 131) and are projected in parallel. Thus, a width d (thickness three-dimensionally) of the projected light is projected with the same width (thickness three-dimensionally) at any distance from the image-side telecentric lens 131 toward the object (regardless of a distance to the object), and expressed by the following equation (2):

$$d = p \times (fL/fM) \qquad (2)$$

where p is a pitch of the microlenses 231, fM is a focal length of the microlens 231, and fL is a focal length of the image-side telecentric lens 131.

In a case where the width d of the projected light is larger than the pupil diameter of the image-side telecentric lens 131, the width d of the projected light is limited by the pupil diameter.

Figure 4A:
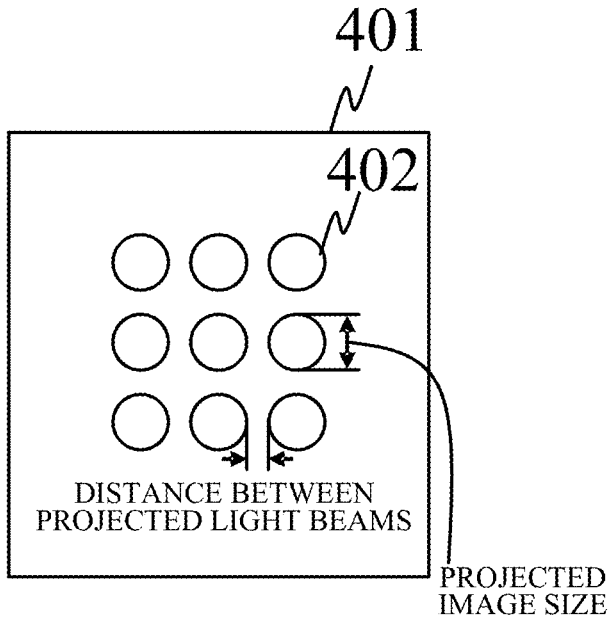
FIGS. 4A, 4B, and 4C illustrate how projected light is projected onto an object in each embodiment.
Figure 4B:
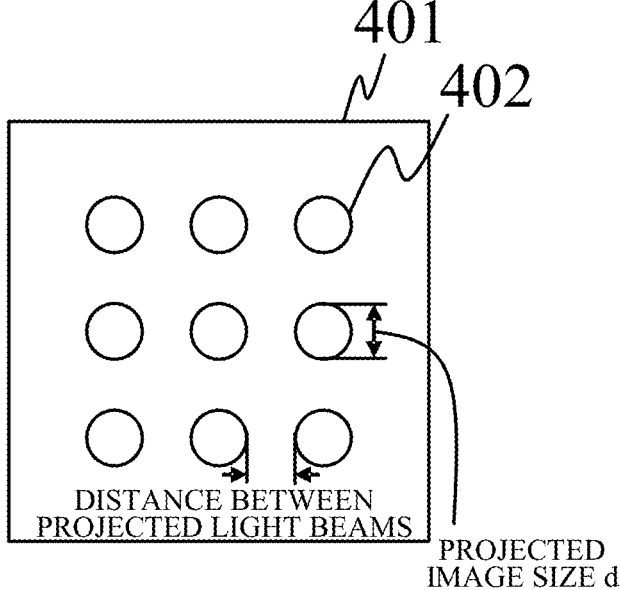
Figure 4C:
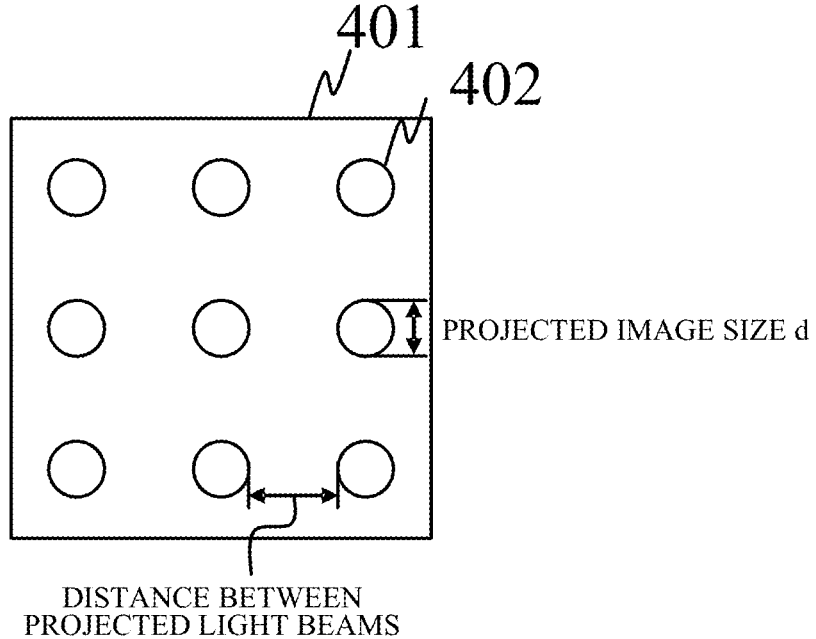

Referring now to FIGS. 4A to 4C, a description will be given of the state of the projected light beams described in FIG. 3 viewed on the object side. FIGS. 4A to 4C illustrate the state of the projected light beams projected onto an object 401. In FIGS. 4A to 4C, the projected light beams divided into 3×3 are projected onto the object 401 as a projected image 402. The projected image size d in FIGS. 4A to 4C and the width d of the projected light in FIG. 3 are equal to each other. FIGS. 4A, 4B, and 4C are illustrated in order of positions closer from the object 401 to the image-side telecentric lens 131 (the light emitter 111 or the light receiver 121 in the optical apparatus 1).

As illustrated in FIGS. 4A to 4C, as a distance between the projected light beams increases as a distance from the image-side telecentric lens 131 increases, but the projected image size d does not change. In other words, the distance between the plurality of split lights split by the optical element 112 and irradiated onto the object 401 after passing through the image-side telecentric lens 131 (projected-light interval) changes according to the distance to the object 401. On the other hand, the width (projected image size d) of each of the plurality of split lights does not change according to the distance to the object 401. Thereby, light emitted from a certain light emitting element 211 can be received only by a specific light receiving element (not illustrated) in the light receiving element array 125, and the light emitting element 211 and the light receiving element can have a one-to-one correspondence. This configuration can provide sequential driving in which only a part of the plurality of light emitting elements 211 is made to emit light, and only the light receiving elements corresponding to the emitted light emitting elements 211 are driven among the plurality of light receiving elements. Thereby, a plurality of light receiving elements can share one TDC, reduce the pixel size, and achieve high resolution.

Figure 5:
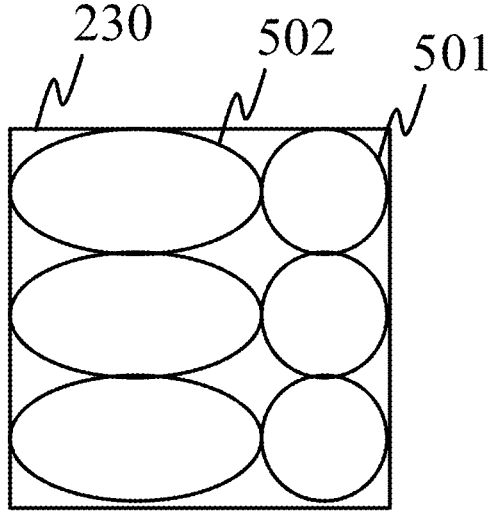
FIG. 5 is a variation of a method of dividing emitted light according to each embodiment.

In this embodiment, the light emitted from one light emitting element 211 is divided into 3×3, but the number of divisions of the emitted light is not limited to 3×3. FIG. 5 illustrates a modified example of a method of dividing the light emitted. As illustrated in FIG. 5, the microlenses do not have to be arranged in a square array like the microlens array 230 in which the microlenses are arranged in a 3×2 array. The microlenses constituting the microlens array 230 may be not only circular microlenses 501 but also elliptical microlenses 502.

Second Embodiment

Figure 6:
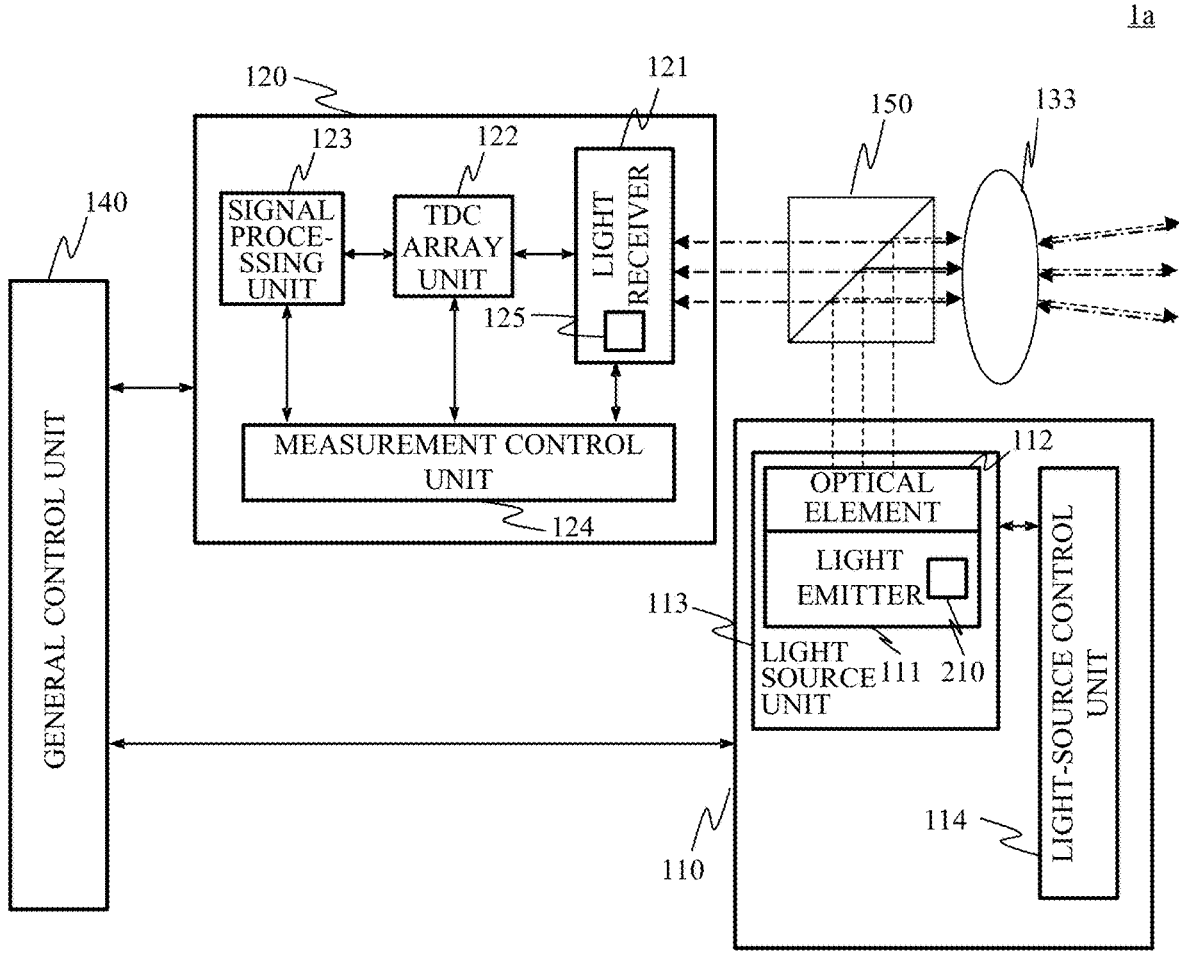
FIG. 6 is a block diagram of a distance measuring apparatus according to a second embodiment.

Referring now to FIG. 6, a description will be given of an optical apparatus (distance measuring apparatus) 1a according to a second embodiment. FIG. 6 is a block diagram of the optical apparatus 1a. The optical apparatus 1a differs from the optical apparatus 1 according to the first embodiment in that it has one image-side telecentric lens 133 and a beam splitter (light dividing unit) 150 instead of two image-side telecentric lenses 131 and 132. That is, the optical apparatus 1a shares the same image-side telecentric lens 133 for light emission and light reception using the beam splitter 150.

In the first embodiment described with reference to FIG. 1, the two-lens optical apparatus 1 in which the light emitting optical system and the light receiving optical system are separate systems. In this case, in a case where the light emitted from a certain light emitting element 211 is projected through the image-side telecentric lens 131, reflected by the object, and returns through the image-side telecentric lens 132, the optical path of the reflected light changes according to an object distance. Therefore, the imaging position on the light receiving element changes according to the object distance, and the distance measurement accuracy is likely to depend on the object distance.

On the other hand, in the optical apparatus 1a according to this embodiment, the same optical path can be used for light emission and light reception. Therefore, this embodiment can eliminate the dependency of the distance measurement accuracy on the object distance caused by the two-lens configuration as described above.

Third Embodiment

Figure 7:
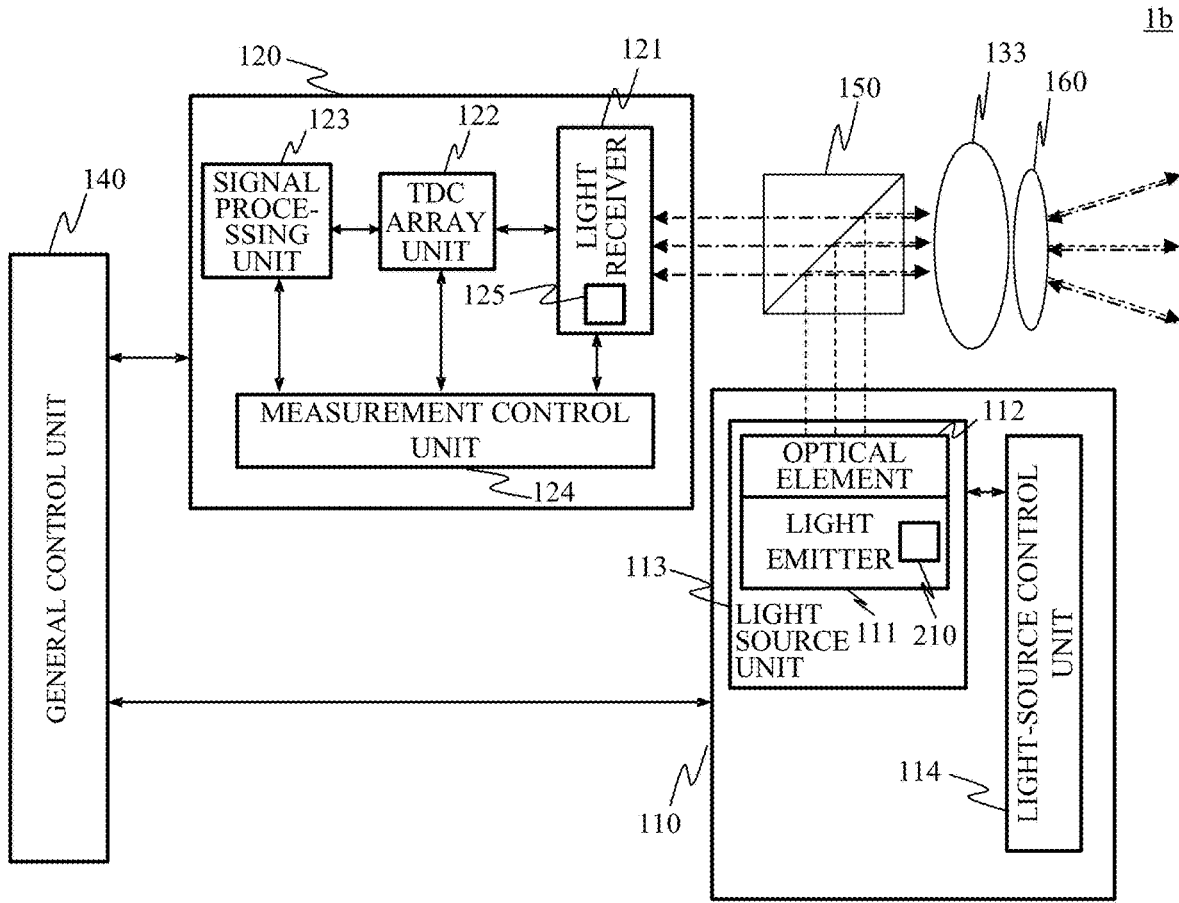
FIG. 7 is a block diagram of a distance measuring apparatus according to a third embodiment.

Referring now to FIG. 7, a description will be given of an optical apparatus (distance measuring apparatus) 1b according to a third embodiment. FIG. 7 is a block diagram of the optical apparatus 1b. The optical apparatus 1b differs from the optical apparatus 1a according to the second embodiment in that it includes a converter (angle-of-view changing unit) 160. The optical apparatus 1*b* according to this embodiment includes the converter 160 and arbitrarily changes an angle of view. In this embodiment, the converter 160 may change an angle of view according to the object distance using a teleconverter or a wide converter. The converter 160 according to this embodiment is applicable to the configuration of the first embodiment.

On-Board System

Figure 8:
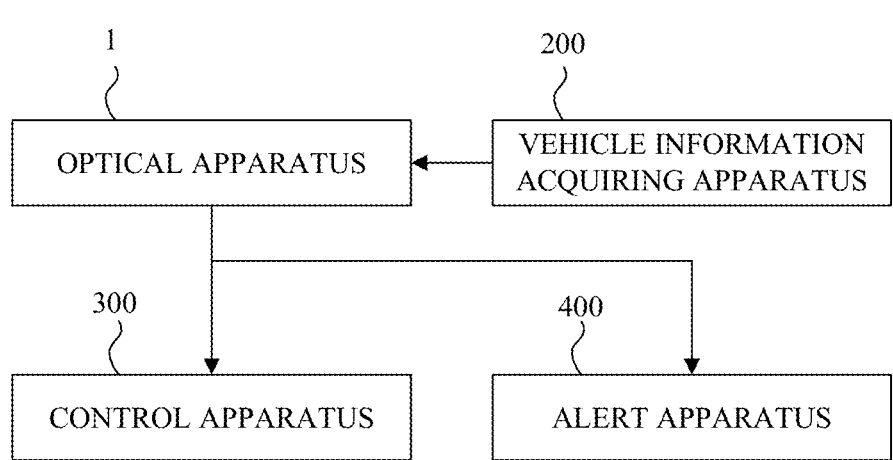
FIG. 8 is a configuration diagram of an on-board system having the distance measuring apparatus according to any one of the above embodiments.
Figure 9:
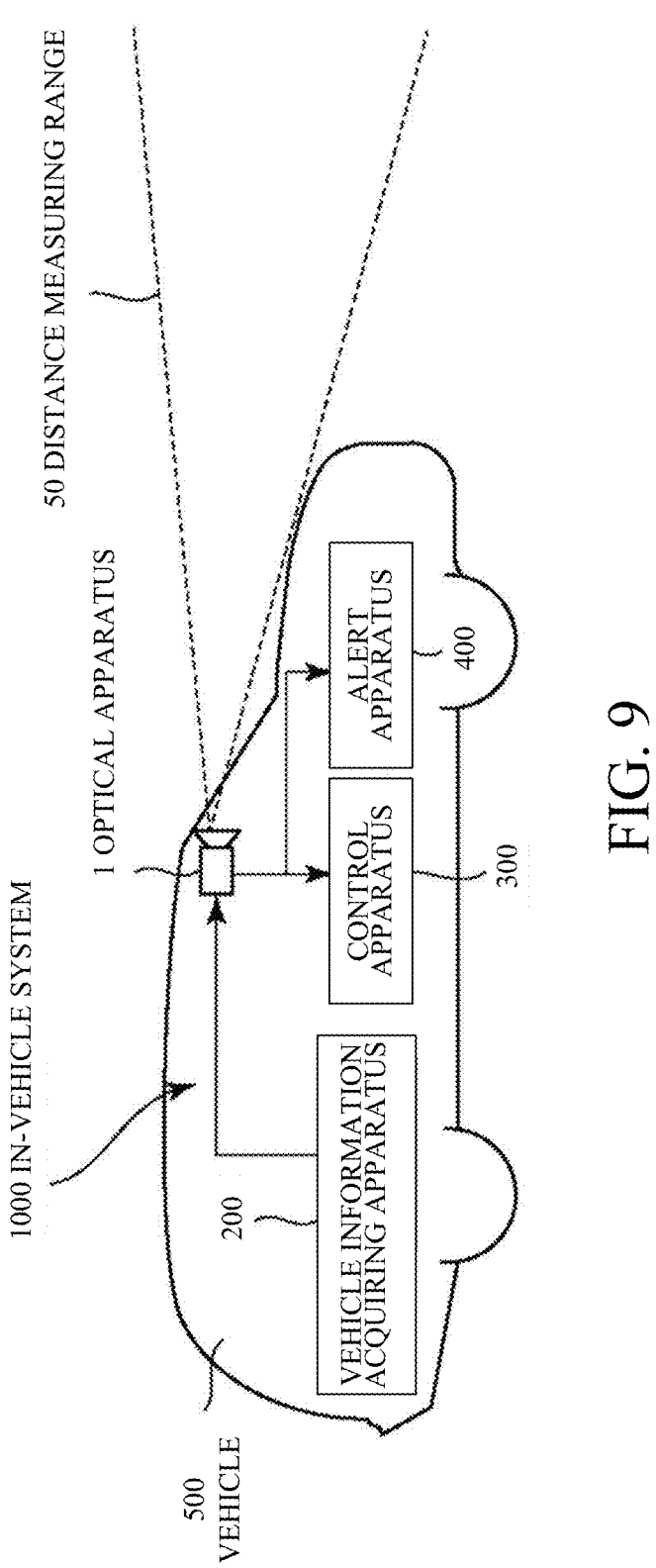
FIG. 9 is a schematic diagram of a movable apparatus having the distance measuring apparatus according to any one of the above embodiments.

FIG. 8 is a configuration diagram of the optical apparatus 1 (1*a*, 1*b*) according to each embodiment and an on-board system (driving support apparatus) 1000 including the optical apparatus 1 (1*a*, 1*b*). The on-board system 1000 is a system held by a movable unit (movable apparatus) such as an automobile (vehicle), and configured to support the driving (operation) of the vehicle based on distance information to an object such as an obstacle and a pedestrian around the vehicle acquired by the optical apparatus 1. FIG. 9 is a schematic diagram of a vehicle 500 as a movable apparatus including the on-board system 1000. In FIG. 9, the distance measuring range (detection range) of the optical apparatus 1 is set to the front of the vehicle 500, but the distance measuring range may be set to the rear or side of the vehicle 500.

As illustrated in FIG. 8, the on-board system 1000 includes the optical apparatus 1, a vehicle information acquiring apparatus 200, a control apparatus (controller or electronic control unit (ECU)) 300, and an alert apparatus (alert unit) 400. In the on-board system 1000, the general control unit 140 in the optical apparatus 1 functions as a distance acquiring unit and a collision determining unit. However, if necessary, the on-board system 1000 may include a distance acquiring unit and a collision determining unit separate from the general control unit 140, or each may be provided outside the optical apparatus 1 (for example, inside the vehicle 500). Alternatively, the control apparatus 300 may be used as the general control unit 140.

Figure 10:
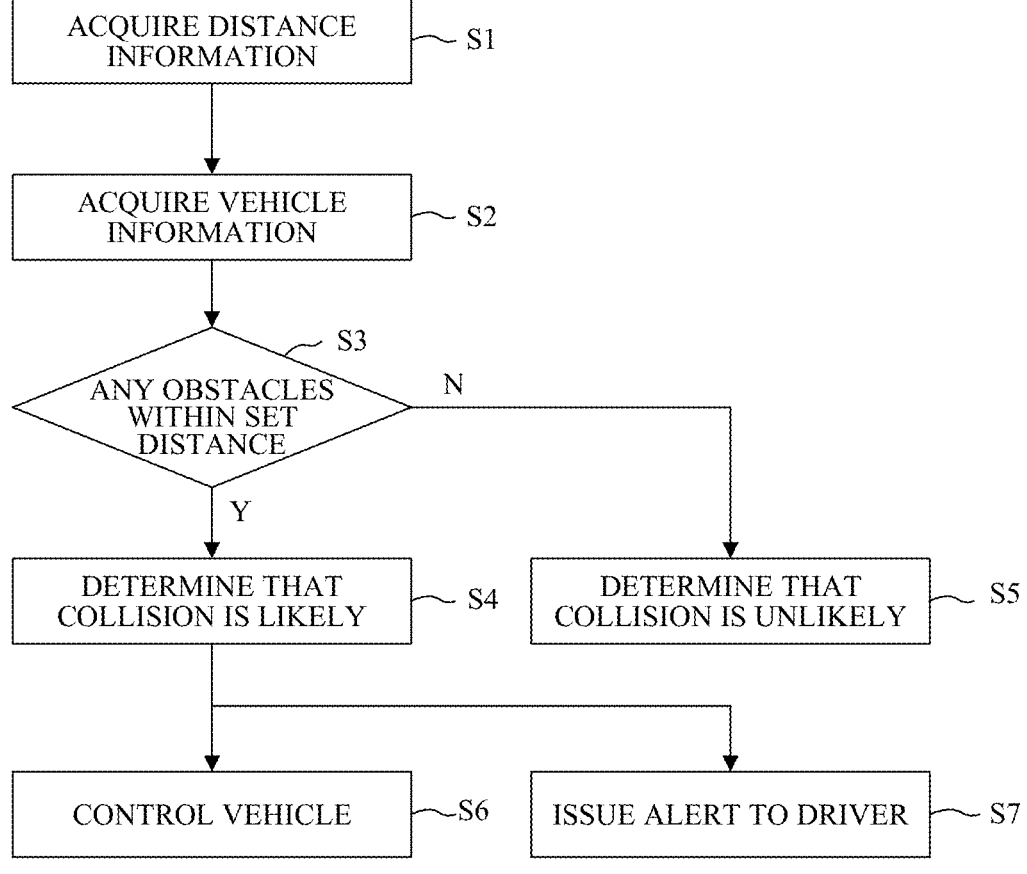
FIG. 10 is a flowchart illustrating an example of the operation of an on-board system having the distance measuring apparatus according to any one of the above embodiments.

FIG. 10 is a flowchart illustrating an example operation of the on-board system 1000 according to this embodiment. A description will now be given of the operation of the on-board system 1000 with reference to this flowchart.

First, in step S1, the light source unit 10 in the optical apparatus 1 illuminates an object around the vehicle, and the light receiver 121 receives the reflected light from the object, and the general control unit 140 acquires distance information to the object based on the signal output by the light receiver 121. In step S2, the vehicle information acquiring apparatus 200 acquires vehicle information including the vehicle speed, yaw rate, steering angle, etc. In step S3, the general control unit 140 determines whether the distance to the object is within a previously set distance range using the distance information acquired in step S1 and the vehicle information acquired in step S2.

This configuration can determine whether an object exists within a set distance around the vehicle and a likelihood of collision between the vehicle and the object. Steps S1 and S2 may be performed in the reverse order to the above, or may be processed in parallel with each other. The general control unit 140 determines that there is a likelihood of collision (step S4) in a case where an object exists within the set distance, and determines that there is no likelihood of collision (step S5) in a case where there is no object within the set distance.

Next, in a case where the general control unit 140 determines that there is a likelihood of collision, it notifies (transmits) the determination result to the control apparatus 300 and the alert apparatus 400. At this time, the control apparatus 300 controls the vehicle based on the determination result of the general control unit 140 (step S6), and the alert apparatus 400 issues an alert to the user of the vehicle (driver, passenger) based on the determination result of the general control unit 140 (step S7). The notification of the determination result may be sent to at least one of the control apparatus 300 and the alert apparatus 400.

The control apparatus 300 can control the movement of the vehicle by outputting a control signal to the driving unit (engine, motor, etc.) of the vehicle. For example, it performs control such as applying the brakes in the vehicle, releasing the accelerator, turning the steering wheel, and generating a control signal that generates a braking force in each wheel to suppress the output of the engine or motor. In addition, the alert apparatus 400 issues an alert to the user, for example, by emitting an alert sound, displaying alert information on the screen of a car navigation system, etc., and applying vibrations to the seat belt or steering wheel.

As described above, the on-board system 1000 according to this embodiment can detect and measure a distance to an object by the above processing, and can avoid a collision between the vehicle and the object. In particular, applying the optical apparatus 1 according to each embodiment to the on-board system 1000 can achieve high distance measurement accuracy, and detect an object and determine a collision with high accuracy.

In this embodiment, the on-board system 1000 is applied to driving support (collision damage reduction), but this embodiment is not limited to this example, and the on-board system 1000 may be applied to cruise control (including adaptive cruise control function) and automatic driving. The on-board system 1000 is not limited to vehicles such as automobiles, but can be applied to movable units, such as ships, aircraft, and industrial robots. The on-board system 1000 is not limited to movable units, but is applicable to various devices that use object recognition, such as intelligent transport systems (ITS) and surveillance systems.

The on-board system 1000 and the vehicle (movable apparatus) 500 may include a notification apparatus (notification unit) for notifying the manufacturer (manufacturer) of the on-board system or the distributor (dealer) of the movable apparatus that the vehicle 500 has collided with an obstacle, if any. For example, the notification apparatus may be one that transmits information (collision information) regarding the collision between the vehicle 500 and an obstacle to a preset external notification destination by e-mail or the like.

A configuration in which the notification apparatus automatically notifies the collision information in this way can promptly take measures such as inspection and repair after the collision occurs. The notification destination of the collision information may be an insurance company, a medical institution, the police, or any other party arbitrarily set by the user. The notification apparatus may be configured to notify the notification destination of not only the collision information but also failure information regarding each part and consumption information regarding consumables. The presence or absence of a collision may be detected using distance information acquired based on the output from the light receiver 121, or may be detected by another detector (sensor).

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide a compact and high-resolution optical apparatus, on-board system, and movable apparatus.

While the disclosure has described example embodiments, it is to be understood that some embodiments are not limited to the disclosed embodiments. The scope of the following claims is to be accorded the broadest interpretation so as to encompass all such modifications and equivalent structures and functions.

What is claimed is:

1. An optical apparatus comprising:
a light emitter including at least one light emitting element;
a light receiver including a plurality of light receiving elements;
an optical element including a plurality of microlenses;
an optical system including a first telecentric lens; and
a processor configured to acquire distance information to an object based on a time required from when the light emitter emits light to when the light receiver receives the light reflected by the object,
wherein the number of microlenses is larger than the number of light emitting elements,
wherein the plurality of microlenses and the first telecentric lens form an afocal system,
wherein the plurality of microlenses splits the light emitted from the light emitter into a plurality of split beams, and
wherein the plurality of split beams are projected onto the object via the first telecentric lens.

2. The optical apparatus according to claim 1, wherein the first telecentric lens is an image-side telecentric lens.

3. The optical apparatus according to claim 1, wherein light emitted from one of the light emitting elements passes through at least two of the plurality of microlenses.

4. The optical apparatus according to claim 1, wherein the light emitting element is a VCSEL.

5. The optical apparatus according to claim 1, wherein the optical system further includes a second telecentric lens,
wherein the light emitted from the light emitter passes through the first telecentric lens and is reflected by the object, and wherein the light reflected by the object passes through the second telecentric lens and is received by the light receiver.

6. The optical apparatus according to claim 1, wherein the optical system further includes a beam splitter,
wherein the light emitted from the light emitter is guided by the beam splitter, passes through the first telecentric lens, and is reflected by the object, and
wherein the light reflected by the object passes through the first telecentric lens, is guided by the beam splitter, and is received by the light receiver.

7. The optical apparatus according to claim 6, wherein the optical system is shared by the light emitter and the light receiver.

8. The optical apparatus according to claim 1, wherein the optical system includes an angle-of-view changing unit configured to change an angle of view.

9. The optical apparatus according to claim 1,
wherein distances between the plurality of split beams that pass through the first telecentric lens and are irradiated onto the object change according to a distance to the object, and
wherein a width of each of the plurality of split beams does not change according to the distance to the object.

10. An on-board system comprising:
the optical apparatus according to claim 1,
wherein the on-board system determines a likelihood of collision between a vehicle and the object based on the distance information to the object obtained by the optical apparatus.

11. The on-board system according to claim 10, further comprising a control apparatus configured to output a control signal to generate a braking force in the vehicle in a case where it is determined that there is a likelihood of collision between the vehicle and the object.

12. The on-board system according to claim 10, further comprising an alert apparatus configured to issue an alert to a user of the vehicle in a case where it is determined that there is a likelihood of collision between the vehicle and the object.

13. The on-board system according to claim 10, further comprising a notification apparatus configured to notify an external party of information regarding the collision between the vehicle and the object.

14. A movable apparatus comprising:
the optical apparatus according to claim 1,
wherein the movable apparatus is movable while holding the optical apparatus.

15. The movable apparatus according to claim 14, further comprising a determining unit configured to determine a likelihood of collision with the object based on the distance information to the object acquired by the optical apparatus.

16. The movable apparatus according to claim 15, further comprising a control unit configured to output a control signal for controlling movement of the movable apparatus in a case where it is determined that there is the likelihood of collision with the object.

17. The movable apparatus according to claim 15, further comprising an alert unit configured to issue an alert to a user of the movable apparatus in a case where it is determined that there is the likelihood of collision with the object.

18. The movable apparatus according to claim 15, further comprising a notification unit configured to notify an external party of information regarding the collision with the object.

* * * * *